United States Patent [19]

Brandt et al.

[11] 4,306,980

[45] Dec. 22, 1981

[54] INVERT EMULSION WELL-SERVICING FLUIDS

[75] Inventors: Israel M. Brandt, Plano; Forest A. Scearce, Houston, both of Tex.

[73] Assignee: NL Industries, Inc., New York, N.Y.

[21] Appl. No.: 99,711

[22] Filed: Dec. 3, 1979

[51] Int. Cl.$^3$ ............................................... C09K 7/06
[52] U.S. Cl. ............................ 252/8.5 P; 252/8.5 M
[58] Field of Search ........... 252/8.5 P, 8.5 M, 8.55 R, 252/39

[56] References Cited

U.S. PATENT DOCUMENTS

| | | | |
|---|---|---|---|
| 2,698,298 | 12/1954 | Giammaria | 252/39 |
| 2,861,042 | 11/1958 | Watkins | 252/8.5 |
| 2,862,881 | 12/1958 | Reddie | 252/8.5 |
| 2,868,729 | 1/1959 | Nelson et al. | 252/39 |
| 2,999,063 | 9/1961 | Hoeppel | 252/8.55 X |
| 3,076,763 | 2/1963 | Nelson | 252/39 |
| 3,136,725 | 6/1964 | Nelson | 252/39 |
| 3,168,475 | 2/1965 | Jordan et al. | 252/8.5 |

*Primary Examiner*—Herbert B. Guynn
*Attorney, Agent, or Firm*—Browning, Bushman & Zamecki

[57] ABSTRACT

A water-in-oil well servicing fluid comprising a continuous oleaginous phase, an aqueous phase, an oleophilic anhydride and lime, and a method of preparing same.

22 Claims, No Drawings

INVERT EMULSION WELL-SERVICING FLUIDS

BACKGROUND OF THE INVENTION

The present invention relates to well servicing fluids and, more particulary, to well servicing fluids of a water-in-oil emulsion type.

Water-in-oil (invert) emulsion well servicing fluids are becoming increasingly popular for drilling into producing formations, for workover operations, and for drilling through salt formations, as well as other instances where it is desirable to avoid exposing the formation to water as a continous phase of the well servicing fluid.

One of the most important properties of a well servicing fluid is that it must possess a low fluid loss, particularly a low water loss. Low water loss drilling fluids permit drilling into heaving shale or similar formations without causing such shale to swell and cave into the bore hole. Low water loss drilling fluids also prevent decreases in permeability due to water blocking of pore space. Low fluid loss water-in-oil emulsion type drilling fluids are particularly advantageous since the oil, being the continuous phase, protects the formation from the water contained in the drilling fluid.

SUMMARY OF THE INVENTION

It is, therefore, an object of the present invention to provide an improved well servicing fluid.

Another object of the present invention is to provide an invert emulsion well servicing fluid which exhibits good filtration control.

Still another object of the present invention is to provide a method of preparing an invert emulsion well servicing fluid exhibiting excellent rheological, suspension, emulsion stability and filtration control properties.

The above and other objects of the present invention will become apparent from the description given herein and the appended claims.

In accordance with the above objects, it has been found that an invert emulsion well servicing fluid can be formed by combining certain oleophilic anhydrides and lime in a water-in-oil emulsion comprising a liquid oleaginous phase and an aqueous phase. The anhydride in the well servicing fluid can be an alkenylsuccinic anhydride or polymer thereof containing from about 2 to about 8 alkenylsuccinic anhydride molecules per molecule of polymer, a copolymer of an alpha-olefin containing from 10 to 24 carbon atoms and maleic anhydride, or a mixture of any of those various anhydrides. In a preferred case, the invert fluids contain an alkenylsuccinic anhydride and one or more of the anhydride polymers. Optionally, but preferably, the fluids contain a water-in-oil emulsifier and a brine forming, water soluble salt such as calcium chloride.

The invention further contemplates a method of preparing an invert emulsion well servicing fluid in which an oleaginous liquid, an aqueous liquid, a water-in-oil emulsifier, the anhydrides noted above, and lime are mixed for a period of time sufficient to increase the viscosity of the fluid. Preferably, in the method, a portion of the oleaginous liquid is first heated to a temperature in excess of about 100° F. and thereafter the emulsifier, and alkenylsuccinic anhydride, the lime and a portion of the water is added and mixed until there is a viscosity increase. The remaining portion of the oleaginous liquid, the anhydride polymer and the remaining portion of the water are then added and the ingredients thoroughly mixed.

DESCRIPTION OF THE PREFERRED EMBODIMENTS

The oleaginous liquid in the fluids of the present invention are usually petroleum oils (hydrocarbons). Preferably, the oleaginous liquids should contain at least some component boiling above the gasoline boiling range, i.e. above about 400° F. at atmospheric pressure. Oils with too high a content of highly volatile hydrocarbons in the gasoline boiling range are undesirable because of the danger of fire, and because of their low viscosity. It is preferred that the oleaginous liquid have a flash point above 140° F. Non-limiting examples of suitable oleaginous liquids which can be employed in the practice of the invention include the following: topped crude oil, gas oils, kerosene, diesel fuels, heavy alkylates, fractions of heavy alkylates, and the like. The more preferred oils are predominantly paraffinic in character since these are less detrimental to rubber components in pumps, lines, etc. It is preferred that the oleaginous liquid have a gravity within the range of 15°–40° API.

The invert emulsion fluids will, generally speaking, contain the oleaginous liquid, the continuous phase, as the major portion, and the aqueous phase as the minor portion. Thus, the volume ratio of the oleaginous phase to the aqueous phase can be in a volume ratio of from about 99/1 to about 1/1, preferably from about 49/1 to about 4/1, most preferably from about 49/1 to about 5/1. The aqueous phase can be fresh water or a solution of water and a brine forming, water soluble salt such as sodium chloride, calcium chloride and the like. The amount of the water soluble salt in the aqueous phase will vary depending on the conditions under which the well servicing fluid is used. However, it is common to use fluids in which the aqueous phase is saturated with respect to the brine forming, water soluble salt.

The anhydrides employed in the fluids of the present invention are those anhydrides which are soluble in the oleaginous phase, i.e. generally oleophilic. Suitable anhydrides include alkenylsuccinic anhydrides and polymers of alkenylsuccinic anhydride wherein the polymer contains from about 2 to about 8, preferably from about 2 to about 4 molecules of the anhydride monomer per molecule of polymer. In addition, the anhydride can comprise a copolymer of an alpha-olefin containing from 10 to 24, preferably 18 to 24, carbon atoms with maleic anhydride, the olefin to maleic anhydride molar ratio being from about 1.5:1 to about 1:1.5, preferably 1:1. Preferably, the olefin-maleic anhydride copolymer will contain from about 4 to about 6 anhydride groups per molecule of polymer. Mixtures of various of the anhydrides can also be employed. The term "anhydride," as used herein, is intended to include dicarboxylic acids in which the carboxyl groups are suitably situated with respect to one another to form cyclic anhydrides by the elimination of one molecule of water.

It is preferred that the alkenyl group in the alkenylsuccinic anhydride polymers contain at least 10 carbon atoms, preferably from 10 to 24 carbon atoms, especially from 12 to 18 carbon atoms. The anhydride will be present in the fluid, at least in an effective amount, i.e in an amount sufficient to impart the desired physical properties to the fluid. In general, however, the anhydride will be present in amounts of up to about 10 pounds per barrel (ppb), preferably from about 1 to about 6 ppb.

It has been found that when the fluids of the present invention contain a long chain alkenylsuccinic anhydride monomer, the rheological, suspension, emulsion stability and low temperature filtration control properties of the fluids are greatly enhanced. The alkenylsuccinic anhydrides particularly useful in the fluids are those wherein the alkenyl group contains at least 10 carbon atoms, preferably from 10 to 24 carbon atoms, especially from 12 to 18 carbon atoms. Non-limiting examples of such alkenylsuccinic anhydrides which are useful include decenylsuccinic anhydride, dodecenylsuccinic anhydride, tetradecenylsuccinic anhydride, octadecenylsuccinic anhydride and the like. The alkenylsuccinic anhydride, when employed, will be present in an effective amount, up to about 10 ppb, preferably from about 1 to about 5 ppb. It is preferred that when both the alkenylsuccinic anhydride and the anhydride polymer are incorporated in the fluids, that the combined amount of the two components be from about 1 to about 10 ppb, preferably from about 1 to about 8 ppb.

The lime, which is also a major component of the well servicing fluid, includes calcium oxide as well as any of the various chemical and physical forms of quicklime, hydrated lime, etc. The lime will be present in the fluids in an effective amount, up to and including about 25 ppb. Preferably, the lime concentration will be at least equal to 50% of the concentration of the anhydride and most preferably at least equal to 150% of the concentration of the anhydride. When a water-in-oil anionic emulsifier is incorporated into the fluids, it is preferred that the lime be present in an amount at least about equal to $0.5x+0.5y$, where x is the concentration of any anionic emulsifier in the fluid and y is the sum of the concentration (ppb) of the alkenylsuccinic anhydride and the anhydride polymers, preferably in an amount at least equal to $0.5x+1.5y$.

Although the lime and the anhydride polymer act, to some extent, as water-in-oil emulsifiers, it is preferred, for ease of preparation, that an invert emulsifier such as disclosed in U.S. Pat. Nos. 2,861,042; 2,946,746; 3,259,572; 3,346,489; 3,590,005; or 3,654,177 be employed. Typical water-in-oil emulsifiers include the polyamide type formed by the reaction of a polyamine with fatty acids and a dibasic acid as well as the anionic water-in-oil emulsifiers disclosed in the aforementioned U.S. Pat. No. 2,861,042. Mixtures of various emulsifiers can be used, if desired. When employed, the emulsifier will be present in an amount of from about 2 to about 15 ppb, more preferably from about 3 to about 10 ppb.

In preparing the well servicing fluid of the present invention, and when the fluids contain only the anhydride polymer, the oleaginous liquid, the aqueous liquid, the lime, preferably a water-in-oil emulsifier and the polymer are mixed together in a suitable fashion, preferably with heating to above about 120° F., until the mixture undergoes an increase in viscosity. If brine forming, water soluble salts such as sodium chloride, calcium chloride and the like are to be added to the fluid, it is preferable that they be added after all of the aqueous liquid has been emulsified into the fluid. If desired, additional agents such as weighting agents, e.g. barite, fluid loss additives, supplemental suspending agents such as organophilic clays, etc., can be added to the fluid.

It is especially preferred that at least a portion of the oleaginous liquid be heated prior to forming the fluids herein. Thus, it has been found desirable to heat a part of the oleaginous liquid to a temperature of at least 100° F. and thereafter mix with the heated portion of the oleaginous liquid, the emulsifier, if used, the anhydride, the lime, and a portion of the aqueous liquid. The components in the heated oleaginous liquid are mixed until there is an increase in viscosity at which point the remaining portion of the oleaginous liquid and the remaining portion of the aqueous liquid are introduced. Thereafter, the weighting agent, the brine forming salts and like materials can be added to the the fluid.

The fluids prepared in accordance with the present invention can be used as drilling fluids, workover fluids, packer fluids, as coring fluids and in other well servicing activities.

To more fully illustrate the present invention, the following non-limiting examples are presented. Unless otherwise indicated, all physical property measurements were made in accordance with testing procedures set forth in STANDARD PROCEDURE FOR TESTING DRILLING FLUIDS, API RP13B, 7th Edition, April, 1978. The physical property parameters referred to in the examples, unless otherwise indicated, are in units expressed as follows:

PV=API plastic viscosity (cps)
YP=API yield point (lb/100 sq. ft.)
10-Sec. Gel.=API 10 second gel strength (lb/100 sq. ft.)
10-Min. Gel.=API 10 minute gel strength (lb/100 sq. ft.)
E.S.=API electrical stability (volts)
N.C.=No Control
HT HP=High Temperature, High Pressure
ppb=pounds per 42-gallon barrel One type of polyanhydride polymers (PA polymers) employed in the following examples were obtained from Gulf Oil Chemicals Company, are designated PA-6, PA-10, PA-14 and PA-18 and are, respectively, the reaction products of alpha olefins having from 6 to 18 carbon atoms per molecule with maleic anhydride. The comonomers are present in a 1/1 molar ratio. The polymers contain from about 4 to about 6 anhydride groups per molecule and are characterized by the following structural formula:

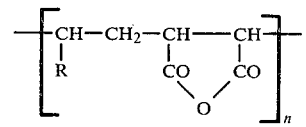

where $R=C_xH_{2x}+1$, $n=4-6$ and $x=4, 8, 12$ and 16 for PA-6, PA-10, PA-14 and PA-18, respectively.

Another type of polyanhydride polymers employed are oligomers of dodecenylsuccinic anhydride (DDSA). DDSA Polymer-I is a mixture of about 20% by weight DDSA monomer and about 80% by weight oligomers of DDSA containing from 2 to 4 moles of DDSA per mole of oligomer. DDSA Polymer-II is a liquid mixture of about 45% by weight of DDSA, 30% by weight of oligomers of DDSA containing 2 to 4 moles of DDSA per mole of oligomer and 25% by weight of heavy aromatic naphtha.

Emulsifier A used in the examples is a water-in-oil emulsifier of a polyamide type formed by the reaction of a polyamine with fatty acids and a dibasic acid. Emulsifier B used in the examples is a mixture of an anionic water-in-oil emulsifier of the type disclosed in U.S. Pat. No. 2,861,042 and Emulsifier A.

EXAMPLE 1

Four different invert oil emulsion drilling fluids having a weight of 12 lb per gallon (ppg) were prepared by mixing on a Multi-Mixer the components listed in Table 1 in the concentration and in the order listed in Table 1. These drilling fluids were thereafter rolled for 16 hours at 150° F. and statically aged for 16 hours at 400° F. After cooling to room temperature, the drilling fluids were stirred for 5 minutes on a Multi-Mixer and evaluated at 80° F. The data obtained and given in Table 1 show the excellent high temperature stability of the fluids in the presence of only a small concentration of water.

TABLE 1

| Sample Mark | A | B | C | D |
|---|---|---|---|---|
| Diesel Oil, bbl. | 0.79 | 0.80 | 0.81 | 0.80 |
| Emulsifier A, ppb. | 10 | 10 | 10 | 10 |
| Lime, ppb. | 10 | 10 | 10 | 10 |
| Water, bbl. | 0.02 | 0.01 | 0 | 0.01 |
| PA-18, ppb. | 6 | 6 | 6 | 4 |
| Barite, ppb. | 250 | 250 | 250 | 250 |
| CaCl₂, ppb. | 4 | 2 | 0 | 2 |
| Oil/Water Ratio (vol/vol) | 98/2 | 99/1 | 100/0 | 99/1 |
| PV | 35 | 52 | 35 | 40 |
| YP | 10 | 32 | 10 | 20 |
| 10-Sec. Gel. | 2 | 5 | 10 | 5 |
| 10-Min. Gel. | 7 | 47 | 30 | 37 |
| E.S. | 2000+ | 2000+ | 2000+ | 2000+ |
| Filtrate, 400° F. - 500 psi | 11.8 | 21.0 | 90 | 18.0 |

EXAMPLE 2

Invert emulsion drilling fluids were prepared containing a 90/10 (vol/vol) diesel oil/water ratio by mixing together on a Multi-Mixer 0.79 bbl. diesel oil, 10 ppb. Emulsifier A, 10 ppb. lime, 0.09 bbl. water, 4 ppb. PA-18 and 20 ppb. calcium chloride. Thereafter, the concentrations of barite indicated in Table 2 were added and mixed 10 minutes, and the samples rolled, aged and evaluated as in Example 1. The data obtained and given in Table 2 indicate that weighted muds having low HTHP filtrates can be obtained using the compositions of this invention.

TABLE 2

| Sample Mark | A | B | C | D | E |
|---|---|---|---|---|---|
| Barite, ppb. | 0 | 280 | 448 | 640 | 880 |
| Density, ppg. | 7.6 | 12.0 | 14.0 | 16.0 | 18.0 |
| PV | 14 | 21 | 42 | 51 | 95 |
| YP | 2 | 3 | 24 | 38 | 80 |
| 10-Sec. Gel. | 1 | 1 | 3 | 5 | 11 |
| 10-Min. Gel. | 2 | 1 | 10 | 8 | 17 |
| E.S. | 470 | 680 | 800 | 1080 | 530 |
| Filtrate, 400° F. - 500 psi | 180 | 8.0 | 8.0 | 9.4 | 10.0 |

EXAMPLE 3

Oil base drilling fluids were prepared by mixing on a Multi-Mixer the components listed in Table 3 in the concentrations and in the order listed in Table 3. The samples were rolled for 16 hours at 150° F., aged for 16 hours at 400° F. and 500 psi, cooled to room temperature, stirred 15 minutes and tested at 78° F.–80° F. The data obtained and given in Table 3 indicate that the lime concentration in the drilling fluids, when an anionic emulsifier is used, must be at least equal to, and preferably greater than, one-half of the sum of the anionic emulsifier concentration and the polyanhydride copolymer concentration. The data also indicate that the drilling fluids containing greater than about 25% by volume aqueous phase, based on the total liquid present, are less stable and have high rheological characteristics.

TABLE 3

| Sample Mark | A | B | C | D | E | F | G | H | I | J | K | L | M | N |
|---|---|---|---|---|---|---|---|---|---|---|---|---|---|---|
| Diesel Oil, ml. | 300 | 300 | 300 | 300 | 300 | 300 | 300 | 300 | 300 | 210 | 240 | 270 | 300 | 328 |
| Emulsifier B, g. | 10 | 10 | 10 | 10 | 6 | 8 | 10 | 12 | 15 | 10 | 10 | 10 | 10 | 10 |
| Water, ml. | 30 | 30 | 30 | 30 | 30 | 30 | 30 | 30 | 30 | 120 | 90 | 60 | 30 | 20 |
| Lime, g. | 5 | 7.5 | 10 | 15 | 10 | 10 | 10 | 10 | 10 | 10 | 10 | 10 | 10 | 10 |
| PA-18, g. | 5 | 5 | 5 | 5 | 5 | 5 | 5 | 5 | 5 | 5 | 5 | 5 | 5 | 5 |
| CaCl₂ (80%), g. | 15 | 15 | 15 | 15 | 15 | 15 | 15 | 15 | 15 | 15 | 15 | 15 | 15 | 15 |
| Barite, g. | 200 | 200 | 200 | 200 | 200 | 200 | 200 | 200 | 200 | 200 | 200 | 200 | 200 | 200 |
| PV | — | 12 | 18 | 28 | 34 | — | — | — | — | — | 74 | 52 | 41 | 30 | 17 |
| YP | — | 6 | 2 | 15 | 21 | — | — | — | — | — | 98 | 30 | 35 | 13 | 7 |
| 10-Sec. Gel. | — | 1 | 1 | 2 | 4 | — | — | — | — | — | 23 | 5 | 9 | 2 | 2 |
| 10-Min. Gel. | — | 2 | 2 | 27 | 59 | — | — | — | — | — | 107 | 42 | 99 | 8 | 2 |
| E.S. | 740 | 860 | 2000+ | 1780 | 1420 | 1360 | 1410 | 1040 | 1020 | 700 | 720 | 2000+ | 2000+ | 1220 |
| Filtrate, 400° F.-500 psi. | 100+ | 200+ | 8 | 10 | 13 | 9 | 8.8 | 4 | 40* | 23 | 20 | 8 | 5 | N.C. |

*Insufficient Lime

EXAMPLE 4

Invert emulsion fluids having the composition of Sample A of Example 3 were prepared, except that various PA polymers at 5 ppb were evaluated. The fluids were rolled for 16 hours at 150° F., stirred for 5 minutes, and tested. The data obtained and given in Table 4 indicate that the olefinic hydrocarbon component of the PA must contain at least 10 carbon atoms.

TABLE 4

| Sample Mark | A | B | C | D | E |
|---|---|---|---|---|---|
| Polymer | PA-6 | PA-10 | PA-14 | PA-18 | NONE |
| PV | * | 18 | 32 | 62 | 9 |
| YP | * | 5 | 6 | 44 | 2 |
| 10-Sec. Gel. | * | 2 | 8 | 23 | 1 |
| 10-Min. Gel. | * | 3 | 18 | 73 | 2 |
| E.S. | * | 730 | 1020 | 1440 | 730 |
| Filtrate, 300° F. - 500 psi, ml. | * | 36 | 25 | 4 | 40 |

*Polymer did not disperse

EXAMPLE 5

Invert emulsion muds (12 ppg) containing an 89/11 (vol/vol) oil/water ratio were prepared by mixing on a Multi-Mixer the components listed in Table 5 in the concentrations and in the order listed in Table 5. These samples were thereafter rolled, aged and evaluated as in Example 1. The data obtained and given in Table 5 indicate the advantageous properties obtained using both the alkenylsuccinic anhydride monomer and the alkenylsuccinic anhydride polymers in the drilling fluids.

TABLE 5

| Sample Mark | A | B | C | D | E | F | G | H |
|---|---|---|---|---|---|---|---|---|
| Diesel Oil, bbl. | 0.72 | 0.72 | 0.72 | 0.72 | 0.72 | 0.72 | 0.72 | 0.7 |
| Emulsifier A, ppb. | 10 | 10 | 10 | 10 | 10 | 10 | 0 | 5 |
| Emulsifier B, ppb. | 0 | 0 | 0 | 0 | 0 | 0 | 10 | 5 |
| DDSA Polymer-I, ppb. | 8 | 6 | 4 | 2 | 0 | 0 | 0 | 0 |
| DDSA, ppb. | 0 | 2 | 4 | 6 | 8 | 0 | 0 | 0 |
| DDSA Polymer-II, ppb. | 0 | 0 | 0 | 0 | 0 | 12 | 12 | 12 |
| Lime, ppb. | 10 | 10 | 10 | 10 | 10 | 10 | 10 | 10 |
| Water, bbl. | 0.09 | 0.09 | 0.09 | 0.09 | 0.09 | 0.09 | 0.09 | 0.09 |
| Barite, ppb. | 250 | 250 | 250 | 250 | 250 | 250 | 250 | 250 |
| $CaCl_2$, ppb. | 18 | 18 | 18 | 18 | 18 | 18 | 18 | 18 |
| PV | 28 | 48 | 45 | 32 | 31 | 46 | 36 | 45 |
| YP | 2 | 16 | 15 | 3 | 10 | 8 | 8 | 10 |
| 10-Sec. Gel. | 1 | 5 | 3 | 1 | 5 | 2 | 2 | 3 |
| 10-Min. Gel. | 15 | 43 | 45 | 2 | 22 | 12 | 10 | 28 |
| E.S. | 600 | 950 | 1060 | 820 | 1200 | 950 | 1500 | 480 |
| Filtrate, 400° F. - 500 psi | 9.0 | 9.6 | 9.0 | 62 | 110 | 38 | 36 | 21 |

EXAMPLE 6

12 ppg invert oil emulsion drilling fluids were prepared for use in drilling in hard rock country. Such drilling fluids should have an API filtrate of less than 10 ml., preferably 3 ml. to 8 ml., and a 250° F. filtrate from about 10 ml. to about 20 ml. These drilling fluids had a 90/10 (vol/vol) diesel oil/water ratio, contained 18 ppb $CaCl_2$, and contained the concentrations of emulsifier, DDSA, and lime indicated in Table 6. These drilling fluids were prepared as in Example 5, rolled at 150° F. for 16 hours, cooled to room temperature, stirred 5 minutes on a Multi-Mixer, and thereafter evaluated at 80° F. The results, given in Table 6, indicate that drilling fluids stable to about 250° F. can be formulated with the DDSA and lime treatment.

TABLE 6

| Sample Mark | A | B | C | D | E | F | G |
|---|---|---|---|---|---|---|---|
| Emulsifier A, ppb. | 0 | 0 | 0 | 0 | 0 | 2 | 1 |
| Emulsifier B, ppb. | 3 | 3 | 3 | 6 | 4 | 2 | 3 |
| DDSA, ppb. | 4 | 2 | 1 | 2 | 1.5 | 1.5 | 1.5 |
| Lime, ppb. | 10 | 10 | 5 | 10 | 5 | 5 | 5 |
| PV | 43 | 48 | 49 | 41 | 24 | 60 | 44 |
| YP | 72 | 59 | 39 | 32 | 9 | 110 | 32 |
| 10-Sec. Gel. | 70 | 58 | 9 | 16 | 4 | 45 | 10 |
| 10-Min. Gel. | 78 | 76 | 85 | 60 | 15 | 300 | 76 |
| E.S. | 1560 | 1350 | 2000+ | 1160 | 860 | 1160 | 1040 |
| API Filtrate, ml. | 7.4 | 7.0 | 1.2 | 4.0 | 4.2 | 1.2 | 3.2 |
| Filtrate, 250° F. - 500 psi | 18.0 | 24.0 | 18.8 | 13.5 | 14.0 | 13.6 | 21.6 |

EXAMPLE 7

Invert emulsion drilling fluids were prepared by mixing on a Hamilton Beach Mixer the components listed in Table 7 in the concentration and in the order listed in Table 7. After stirring fifteen minutes the fluids were evaluated, rolled sixteen hours at 150° F., cooled to room temperature, stirred fifteen minutes, and again evaluated. The data obtained and given in Table 7 indicated that the DDSA increased the emulsion stability and rheology of these fluids both initially and after heating.

TABLE 7

| Sample Mark | A | B | C | D |
|---|---|---|---|---|
| Diesel Oil, bbl. | 0.86 | 0.86 | 0.86 | 0.86 |
| Emulsifier A, ppb. | 10 | 10 | — | — |
| Emulsifier B, ppb. | — | — | 10 | 10 |
| Lime, ppb. | 10 | 10 | 10 | 10 |
| Water, bbl. | 0.086 | 0.086 | 0.086 | 0.086 |
| DDSA, ppb. | — | 5 | — | 5 |
| $CaCl_2$, ppb. | 15 | 15 | 15 | 15 |
| Barite, ppb. | 200 | 200 | 200 | 200 |
| Initial Properties | | | | |
| E.S. | 560 | 580 | 560 | 2000+ |
| PV | 6 | 40 | 7 | 34 |
| YP | 2 | 41 | 2 | 82 |
| 10-Sec. Gel. | 1 | 7 | 1 | 8 |
| 10-Min. Gel. | 1 | 108 | 1 | 112 |
| Properties After Rolling at 150° F. for 16 Hours | | | | |
| E.S. | 780 | 2000+ | 680 | 2000+ |
| PV | 10 | 60 | 12 | 84 |
| YP | 0 | 57 | 0 | 57 |
| 10-Sec. Gel. | 0 | 31 | 0.5 | 38 |
| 10-Min. Gel. | 1 | 91 | 1 | 206 |

EXAMPLE 8

Samples of an invert emulsion field mud were: (1) treated with either 5 ppb. lime or 5 ppb. lime and 3 ppb. of DDSA-Polymer-II; (2) rolled 16 hours at 150° F.; (3) aged at 400° F. and 500 psi for 19 hours; (4) cooled to room temperature, stirred 15 minutes and tested. The data obtained and given in Table 8 show the effect of the anhydride polymer and lime on the properties of the treated mud.

TABLE 8

| Sample Mark | A | B |
|---|---|---|
| DDSA-Polymer-II, ppb. | 0 | 3 |
| Lime, ppb. | 5 | 5 |
| PV | 108 | 124 |
| YP | 2 | 18 |
| 10-Sec. Gel. | 9 | 12 |
| 10-Min. Gel. | 26 | 26 |
| E.S. | 1660 | 2000+ |
| Filtrate, 400° F. - 500 psi | 21.0* | 6.0** |

*Emulsion in filtrate
**All oil filtrate

EXAMPLE 9

The influence of the order of addition of the components in preparing the emulsions was evaluated to determine the best preparation procedure when using $CaCl_2$ solution as compared to using fresh water and powdered CaCl$_2$. The effect of heating the diesel oil was also evaluated. The order of additions are listed in Table 9A. All samples were mixed at low shear with a Lightnin Mixer. The diesel oil was heated to decrease the reaction time as noted in Table 9A. The mixing temperature varied between 120°–130° F. The water-in-oil emulsifier, alkenylsuccinic anhydride, PA polymer, water and lime were added to the hot diesel oil. In samples D through J the lime was first prehydrated in the small amount of fresh water and added as a slurry to the diesel oil. After mixing for 10 minutes, the remainder of the diesel oil, anhydride polymer, and weighting material were added and the mixing continued for the period of time noted in Table 9A. Thereafter, the calcium chloride was added and the mixing continued for 30 minutes. The samples were tested before and after rolling at 150° F. for 16 hours. The data obtained and given in Table 9B indicate that: the emulsions should preferably be prepared by heating at least a portion of the diesel oil to improve the initial properties of the emulsions; the lime must react with the alkenylsuccinic anhydride, anhydride polymer, and anionic emulsifier before adding the calcium chloride. Thus the calcium chloride should be added last when it is desired in the emulsion. A comparison of samples I and J indicate that if insufficient water is present in the fluid to enable the alkenylsuccinic anhydride, anhydride polymer and anionic emulsifier to react with the lime, then the anhydride polymer must be added only after the alkenylsuccinic acid and anionic emulsifier have reacted with the lime, i.e. only after the oleaginous mixture has increased in viscosity.

TABLE 9A

| Sample Mark | A | B | C | D | E | F | G | H | I | J |
|---|---|---|---|---|---|---|---|---|---|---|
| Diesel Oil, 150°–160° F., bbl. | 0.8 | 0.8 | 0.8 | 0.8 | 0.4 | 0.4** | 0.4** | 0.4 | 0.4 | 0.4 |
| Emulsifier B, ppb. | 5 | 5 | 5 | 5 | 5 | 5 | 5 | 5 | 5 | 5 |
| DDSA, ppb. | 2 | 2 | 2 | 2 | 1.3 | 1.3 | 1.3 | 1.5 | 1.5 | 1.5 |
| DDSA Polymer-II, ppb. | 0 | 0 | 0 | 0 | 0 | 0 | 0 | 0 | 2 | 0 |
| Lime, ppb. | 5 | 5 | 5 | 5 | 5 | 5 | 5 | 5 | 5 | 5 |
| Fresh Water, bbl. | 0 | 0.15 | 0.15 | 0.03* | 0.03* | 0.03* | 0.03* | 0.03* | 0.03* | 0.03* |
| Stirred, min. | 10 | 10 | 10 | 10 | 10 | 10 | 10 | 10 | 10 | 10 |
| Diesel Oil, 72° F., bbl. | 0 | 0 | 0 | 0 | 0.4 | 0.4 | 0.4 | 0.5 | 0.5 | 0.5 |
| DDSA Polymer-II, ppb. | 0 | 0 | 0 | 0 | 0 | 0 | 0 | 0 | 0 | 2 |
| Barite, ppb. | 40 | 40 | 40 | 40 | 40 | 40 | 40 | 40 | 40 | 40 |
| Stirred, min. | — | — | 20 | 20 | 20 | 20 | 35 | 20 | 20 | 20 |
| CaCl$_2$ solution, bbl. | 0.2 | 0 | 0 | 0.17 | 0.17 | 0.17 | 0.17 | 0.10 | 0.10 | 0.10 |
| CaCl$_2$ powder, ppb. | 0 | 30 | 30 | 0 | 0 | 0 | 0 | 0 | 0 | 0 |
| Stirred, min. | 30 | 30 | 30 | 30 | 30 | 30 | 30 | 30 | 30 | 30 |

*Water mixed with the lime before adding to the mixture.
**Diesel oil temperature was about 72° F., room temperature

TABLE 9B

| Sample Mark | A | B | C | D | E | F | G | H | I | J |
|---|---|---|---|---|---|---|---|---|---|---|
| Initial Properties | | | | | | | | | | |
| PV | 10 | 28 | 37 | 62 | 27 | 16 | 20 | 18 | 8 | 18 |
| YP | 0 | 22 | 46 | 68 | 16 | 1 | 6 | 5 | 0 | 5 |
| 10-Sec. Gel. | 0 | 3 | 10 | 20 | 2 | 1 | 1 | 2 | 0 | 1 |
| E.S. | 300 | 1030 | 1860 | 1660 | 7 | 1 | 2 | 640 | 910 | 1100 |
| Properties After Rolling | | | | | | | | | | |
| PV | 16 | 65 | 65 | 80 | 40 | 55 | 35 | 22 | 22 | 20 |
| YP | 1 | 100 | 120 | 140 | 45 | 65 | 35 | 21 | 0 | 6 |
| 10 Sec. Gel. | 1 | 30 | 40 | 75 | 10 | 19 | 8 | 4 | 0 | 4 |
| 10-Min. Gel. | 1 | 250 | 300 | 275 | 25 | 50 | 20 | 16 | 1 | 17 |
| E.S. | 280 | 1640 | 1340 | 820 | 780 | 380 | 480 | 1080 | 280 | 1400 |
| API Filtrate, ml. | 1.8 | — | 1.4 | 1.3 | — | — | — | 1.4 | — | 9.8 |
| Filtrate, 250° F. - 500 psi, ml. | — | 10.0 | 8.6 | 6.4 | 18.0 | — | — | 17.0 | — | 8.4 |
| Water in Filtrate, ml. | — | 2.0 | 1.5 | 1.4 | 5.0 | — | — | 4.0 | — | Trace |

EXAMPLE 10

Invert, water-in-oil emulsion fluids were prepared by mixing on a Multi-Mixer the materials listed in Table 10. The materials were added to the diesel oil in the order listed and mixed for 20 minutes. After cooling to 74° F.–80° F., the initial rheology and electrical stability of the emulsions were evaluated. The samples were then placed in sealed pint jars, rolled at 150° F. for 16 hours, cooled to 74° F.–80° F., mixed 5 minutes, and evaluated for the rheological, electrical stability and filtration properties. The data obtained are given in Table 10. The samples marked A, E and H did not contain a water-in-oil emulsifier. The remainder of the samples contained either tall oil fatty acid or crude tall oil as a water-in-oil emulsifier. As seen, samples A, E and H all had good stability and acceptable rheological properties; however, they had very poor filtration characteristics. The water-in-oil emulsifier appreciably improved the filtration characteristics of the emulsions.

TABLE 10

| Sample Mark | A | B | C | D | E | F | G | H |
|---|---|---|---|---|---|---|---|---|
| Diesel Oil, bbl. | 0.63 | 0.63 | 0.63 | 0.63 | 0.63 | 0.63 | 0.63 | 0.63 |
| DDSA Polymer II, ppb. | 4 | 4 | 4 | 4 | 8 | 8 | 8 | 10 |
| DDSA, ppb. | 0 | 0 | 0 | 0 | 0 | 0 | 0 | 0 |
| Tall Oil Fatty Acid, ppb. | 0 | 6 | 0 | 2 | 0 | 4 | 0 | 0 |
| Crude Tall Oil, ppb. | 0 | 0 | 6 | 0 | 0 | 0 | 4 | 0 |

TABLE 10-continued

| Sample Mark | A | B | C | D | E | F | G | H |
|---|---|---|---|---|---|---|---|---|
| Lime, ppb. | 10 | 10 | 10 | 10 | 10 | 10 | 10 | 10 |
| Water, bbl. | 0.18 | 0.18 | 0.18 | 0.18 | 0.18 | 0.18 | 0.18 | 0.18 |
| Barite, ppb. | 250 | 250 | 250 | 250 | 250 | 250 | 250 | 250 |
| CaCl$_2$, powder, ppb. | 36 | 36 | 36 | 36 | 36 | 36 | 36 | 36 |
| Initial Properties | | | | | | | | |
| PV | 25 | 27 | 22 | 34 | 35 | 25 | 25 | 34 |
| YP | 5 | 1 | 0 | 12 | 5 | 1 | 0 | 15 |
| 10-Min. Gel. | 7 | 1 | 1 | 15 | 8 | 8 | 1 | 15 |
| E.S. | 920 | 290 | 260 | 390 | 1700 | 780 | 740 | 2000+ |
| After Rolling at 150° F. | | | | | | | | |
| PV | 37 | 90 | 56 | 36 | 45 | 150 | 85 | 80 |
| YP | 11 | 150 | 59 | 24 | 15 | 200 | 180 | 70 |
| 10-Min. Gel. | 14 | 450 | 48 | 30 | 20 | 175 | 250 | 50 |
| E.S. | 1000 | 1260 | 1060 | 260 | 1520 | 220 | 640 | 2000+ |
| Filtrate, 300° F. - 500 psi, ml. | 102 | 8 | 4 | 20 | 80 | 10 | 8 | 56 |
| Water in Filtrate, ml. | 28 | 0 | 0 | 2 | 12 | Trace | Trace | 4 |

We claim:

1. An invert emulsion well servicing fluid comprising: a liquid hydrocarbon oleaginous phase, an aqueous phase, the volume ratio of said oleaginous phase to said aqueous phase being from about 99/1 to about 1/1, from about 1 to about 10 pounds per barrel of an oleophilic anhydride selected from the class consisting of an alkenylsuccinic anhydride wherein the alkenyl group contains at least 10 carbon atoms, polymers of an alkenylsuccinic anhydride containing from about 2 to about 8 alkenylsuccinic anhydride molecules per molecule of polymer and wherein the alkenyl group contains at least 10 carbon atoms, and mixtures thereof, and lime, said lime being present in an amount of at least 50% of said anhydride.

2. The fluid of claim 1 wherein said volume ratio of said oleaginous phase to said aqueous phase is from about 49/1 to about 5/1.

3. The fluid of claim 1 wherein said oleaginous phase comprises a hydrocarbon oil, at least a part of which boils above 400° F., and which is selected from the class consisting of topped crude oil, gas oil, kerosene, diesel fuel, heavy alkylate, fractions of heavy alkylate, and mixtures thereof.

4. The fluid of claim 1 wherein said aqueous phase comprises a brine.

5. The fluid of claim 1 wherein said alkenyl group in said anhydride polymer or said alkenylsuccinic anhydride contains from 12 to 18 carbon atoms.

6. The fluid of claim 1 wherein said lime is present in an effective amount, up to about 25 ppb.

7. The fluid of claim 1 wherein the concentration of said lime is at least equal to 150% of the concentration of said anhydride.

8. The fluid of claim 1 further including a water-in-oil emulsifier.

9. The fluid of claim 8 wherein said emulsifier is present in an amount from about 2 to about 15 ppb.

10. The fluid of claim 8 wherein the concentration of said lime is at least equal to one-half of:
 (a) the concentration of said anhydride; and
 (b) the concentration of any anionic water-in-oil emulsifier present in the fluid.

11. The fluid of claim 1 further including a weighting agent.

12. The fluid of claim 11 wherein said oleaginous phase comprises a hydrocarbon oil, at least a part of which boils above 400° F., and which is selected from the class consisting of topped crude oil, gas oil, kerosene, diesel fuel, heavy alkylate, fractions of heavy alkylate, and mixtures thereof.

13. The fluid of claim 11 wherein said aqueous phase comprises a brine.

14. The fluid of claim 11 wherein said alkenyl group is in said anhydride polymer or said alkenylsuccinic anhydride contains from 12 to 18 carbon atoms.

15. The fluid of claim 11 wherein said lime is present in an effective amount, up to about 25 ppb.

16. The fluid of claim 11 wherein the concentration of said lime is at least equal to 150% of the concentration of said anhydride.

17. A method of preparing an invert emulsion well servicing fluid comprising mixing together an oleaginous hydrocarbon liquid, water, a water-in-oil emulsifier, from about 1 to about 10 pounds per barrel of an oleophilic anhydride selected from the class consisting of alkenylsuccinic anhydride, wherein the alkenyl group contains at least 10 carbon atoms, polymers of alkenylsuccinic anhydride containing from about 2 to about 8 alkenylsuccinic anyhydride molecules per molecule of polymer, said alkenyl group containing at least 10 carbon atoms, and mixtures thereof, and lime, said lime being present in an amount of at least 50% of said anhydride, said mixing being conducted for a period of time sufficient to increase the viscosity of the fluid.

18. The method of claim 17 including mixing into said fluid a brine forming, water soluble salt after said viscosity has been increased.

19. The method of claim 17 including heating at least a portion of the oleaginous liquid to a temperature in excess of about 100° F. and thereafter mixing said heated portion with said emulsifier, said anhydride, said lime and at least a portion of said water, the quantity of water being sufficient to hydrate at least one-half of the amount of lime present, said mixing being conducted for a period of time sufficient to increase the viscosity of the mixture, and thereafter mixing into the viscosified mixture the remaining portion of the oleaginous liquid and the remaining portion of said water.

20. The method of claim 19 including adding a brine forming, water soluble salt together with the remaining portion of said water.

21. The method of claim 17 wherein said anhydride comprises alkenylsuccinic anhydride and an anhydride polymer and wherein at least a portion of the oleaginous liquid is heated to a temperature in excess of about 100° F. and thereafter said heated portion is mixed with said emulsifier, said alkenylsuccinic anhydride, said lime, and at least a portion of said water, the quantity of water being sufficient to hydrate at least one-half of the amount of lime present, said mixing being conducted for a period of time sufficient to increase the viscosity of the mixture, and wherein the viscosified mixture is thereafter mixed with the remaining portion of the oleaginous liquid, the anhydride polymer, and the remaining portion of said water.

22. The method of claim 21 including adding a water soluble salt together with the remaining portion of said water.